(12) United States Patent
Tsai

(10) Patent No.: US 8,453,534 B2
(45) Date of Patent: Jun. 4, 2013

(54) BRAKING HANDLEBAR FOR BICYCLE

(76) Inventor: Szu-Fang Tsai, Changhua (TW)

( * ) Notice: Subject to any disclaimer, the term of this patent is extended or adjusted under 35 U.S.C. 154(b) by 87 days.

(21) Appl. No.: 13/070,495

(22) Filed: Mar. 24, 2011

(65) Prior Publication Data

US 2012/0240713 A1 Sep. 27, 2012

(51) Int. Cl.
*F16C 1/10* (2006.01)
(52) U.S. Cl.
USPC ........................................................ 74/502.2
(58) Field of Classification Search
USPC .......... 74/473.12, 501.6, 502.2, 551.1, 551.8, 74/551.9; 188/24.22
See application file for complete search history.

(56) References Cited

U.S. PATENT DOCUMENTS

| 5,660,082 | A | * | 8/1997 | Hsieh | 74/502.2 |
| 6,161,448 | A | * | 12/2000 | Wang | 74/502.2 |
| 2006/0266594 | A1 | * | 11/2006 | Tsai | 188/24.22 |
| 2007/0175290 | A1 | * | 8/2007 | Fujii | 74/502.2 |
| 2009/0114057 | A1 | * | 5/2009 | Fukui et al. | 74/551.8 |
| 2011/0048161 | A1 | * | 3/2011 | Shipman | 74/502.2 |

* cited by examiner

Primary Examiner — Vicky Johnson

(57) ABSTRACT

A braking handlebar for a bicycle includes a combining device, one end thereof being axially mounted to a handle; a braking handlebar, having a pressing section, a pivoting section and an accommodating section, wherein the pivoting section is pivotally connected to one end of the combining device opposite to the handle, and the accommodating section is in parallel to an axial direction of the handle; and a screw adjusting element, movable mounted to the accommodating section of the braking handlebar and connected to one end of a braking cable; wherein the braking cable is loosened or tightened by using the screw adjusting element. Since the screw adjusting element offers the function of being able to rotate, the braking cable can be prevented from being bent excessively, further from generating friction which may results in brake failure.

4 Claims, 7 Drawing Sheets

BRAKING HANDLEBAR FOR BICYCLE

BACKGROUND OF THE INVENTION

1. Field of the Invention

The present invention relates to a braking handlebar, and particularly to a braking handlebar for a bicycle, which prevents excessively large bent angle when braking and uses the screw adjusting element to loosen or tighten the braking cable.

2. Description of Related Art

The structure of a bicycle basically includes a frame system, a transmission system, a wheel system, a disc brake system and other spare parts. Each bicycle consists of two thousand of major and minor parts. Such a mechanical transport means does not need any fuels, and instead is driven by man's treading in combination of ergonomics, aerodynamics, and physical and mechanical principles. Having advantages of environmental protection, fitness, easy travel and convenient to parking, bicycles have become indispensable in the modern leisure life.

The main components of the braking system include a braking handlebar, a brake, and braking cable. The operation of the main components includes rotating the braking handlebar to drive the braking cable to shift, and thereby drive the brake to generate the friction against the wheels so as to stop the wheels and achieve the braking effect. The transmission system relates to the user's safety in use. The braking cable breaks or the brake pads become thinner due to being wore down for a while, which intends to result in brake failure. In design of the structure, the basic conditions of transmission sensitivity and braking effectiveness must be considered together with the concerns of assembly, cost and construction.

The braking cable can be made of metal and plastics. The plastic braking cable may have a multi-layered coating, and the material of the plastics can be PU, carbon fiber or other composite materials. The conventional braking cable discloses a structure of metallic layers. The braking cable consists of a spiral metal tube through an internal section of which a plastic inner tube penetrates, while an external section of which is surrounded by a plastic outer tube to protect the spiral metal tube. A braking conductive line penetrates through the internal section of the plastic inner tube. The above braking cable structures have their own advantages. In the braking cable having the metal tube, the shift of cable inside the frame will be not affected because the barking cable is not bent excessively, and therefore the braking effect will be not deteriorated.

Therefore, there is a need of a novel braking handlebar for a bicycle which overcomes the above disadvantages of riding safety.

SUMMARY OF THE INVENTION

The object of the present invention is to provide a braking handlebar for a bicycle, which prevents brake failure caused by the braking cable has been bent excessively for a while, and furthermore is easy to loosen or tighten the braking cable during the replacement of the braking cable.

In order to achieve the above and other objectives, the braking handlebar for a bicycle includes braking handlebar for a bicycle includes a combining device, one end thereof being axially mounted to a handle; a braking handlebar, having a pressing section, a pivoting section and an accommodating section, wherein the pivoting section is pivotally connected to one end of the combining device opposite to the handle, and the accommodating section is in parallel to an axial direction of the handle; and a screw adjusting element, movable mounted to the accommodating section of the braking handlebar and connected to one end of a braking cable; wherein the braking cable is loosened or tightened by using the screw adjusting element.

The screw adjusting element includes a cylindrical body, an adjustable screw and the inner screw tube. The cylindrical body is movable mounted inside accommodating section and has a horizontal penetrating hole and a vertical penetrating hole. The horizontal penetrating hole is in parallel to the axial direction of the handle. The axial direction of the horizontal penetrating hole is vertical to the axial direction of the vertical penetrating hole. The inner screw tube is in parallel to the axial direction of the handle and penetrates through the horizontal penetrating hole, and has a thread part and a head. The adjustable crew is movable screwed onto the thread part of the inner screw tube, and penetrates through the vertical penetrating hole in manner of being able to rotate. The head is connected to one end of thread part away from the handle. The braking cable penetrates through the thread part and is secured onto the head.

When the pressing section is not pressed down and is at its normal status, the core of the inner screw tube is as high as the core of the handle. When the pressing section is pressed down and becomes to be a braking status, the core of the inner screw tube is slightly lower than the core of the handle, and the screw adjusting element stands at tilt angle in order to cooperation with the braking cable.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
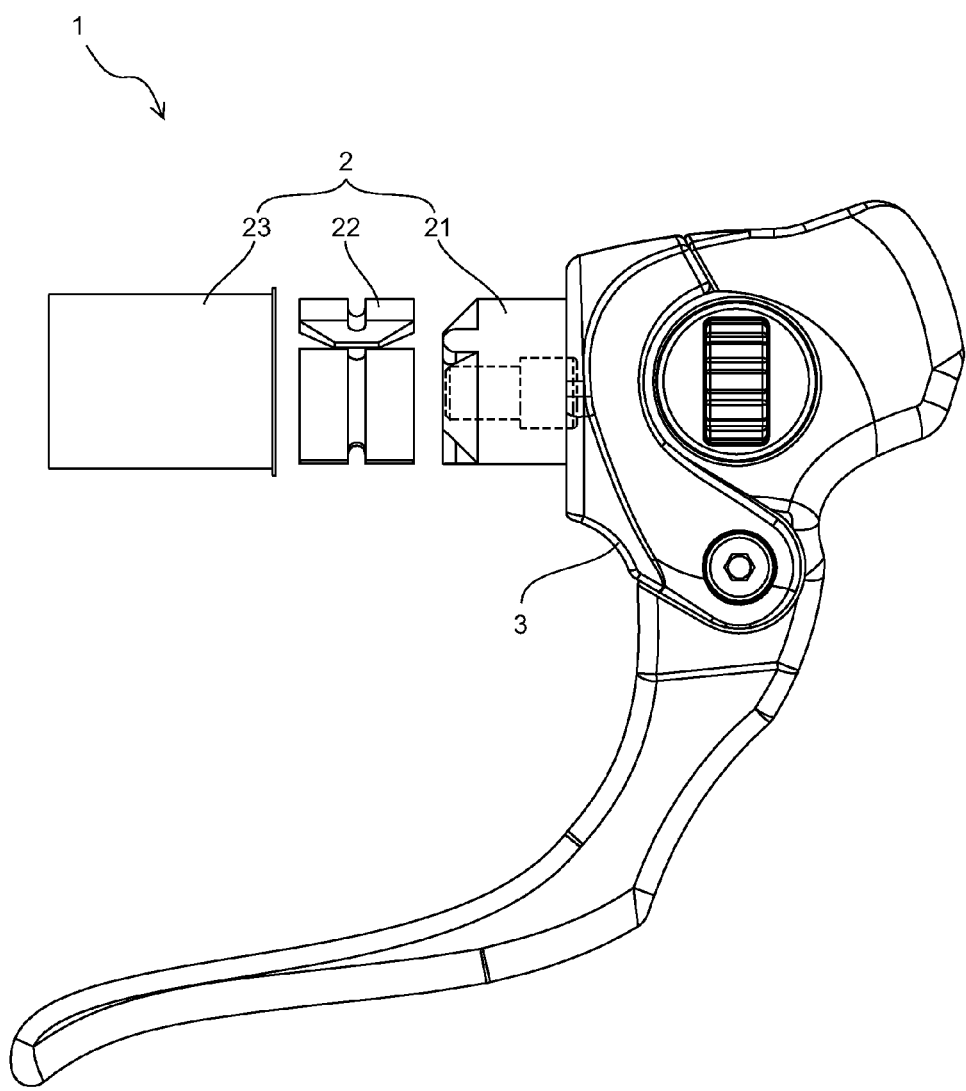
FIG. 1 is a side view of a braking handlebar for a bicycle according to the invention.
Figure 2:
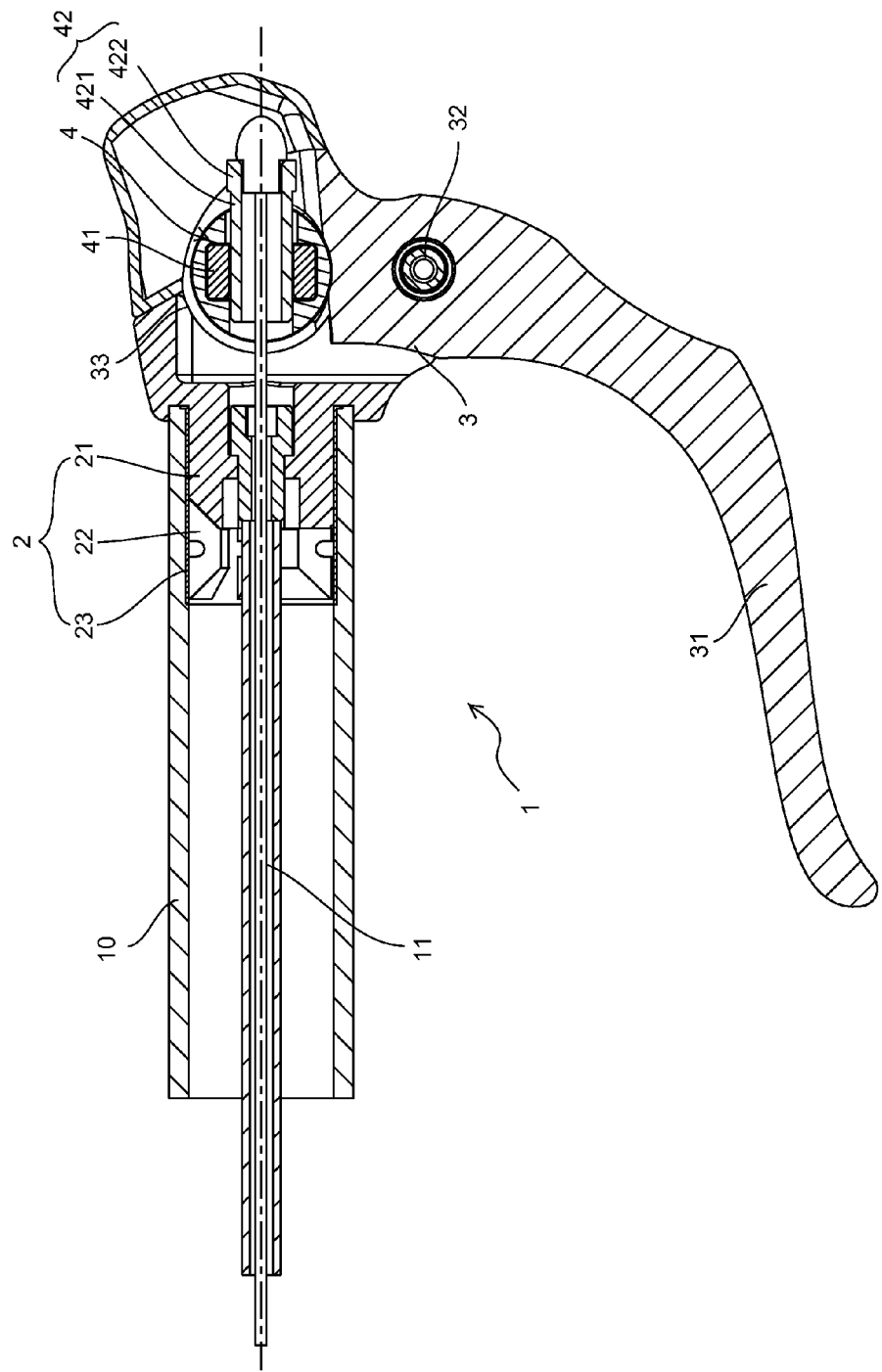
FIG. 2 is a cross-sectional view of a braking handlebar for a bicycle according to the invention.
Figure 3:
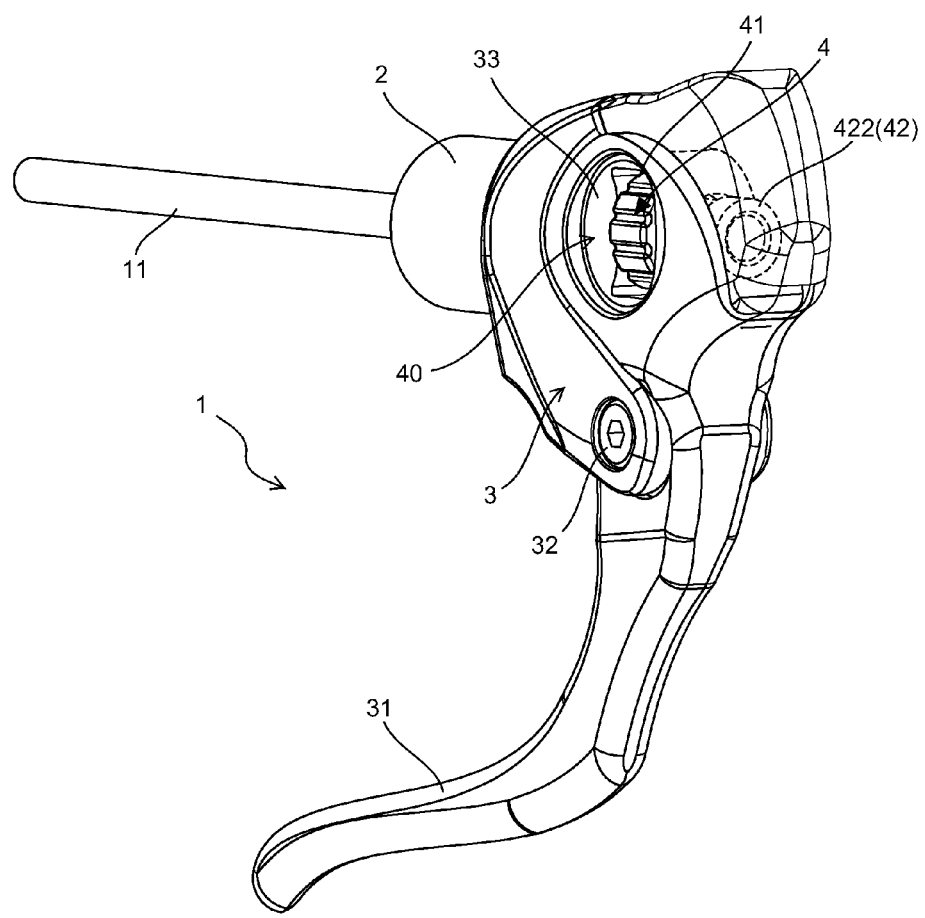
FIG. 3 is a perspective view (1) of a braking handlebar for a bicycle according to the invention.
Figure 3A:
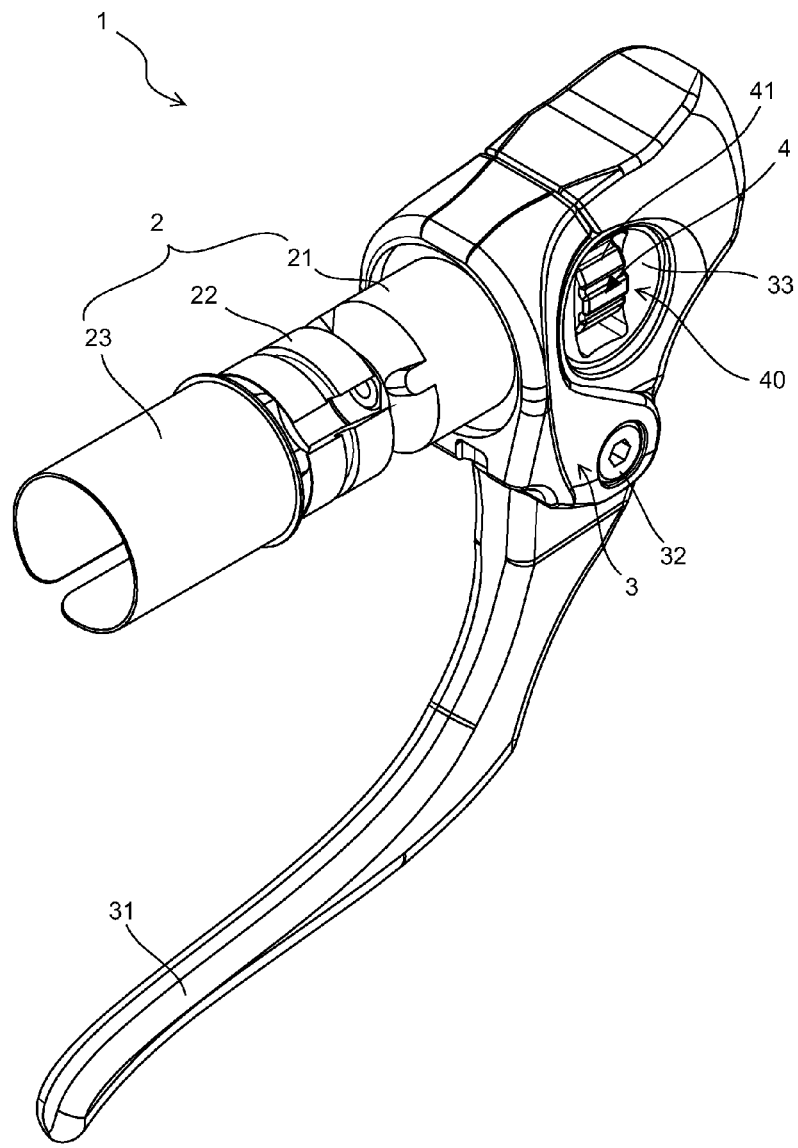
FIG. 3A is a perspective view (2) of a braking handlebar for a bicycle according to the invention.
Figure 4:
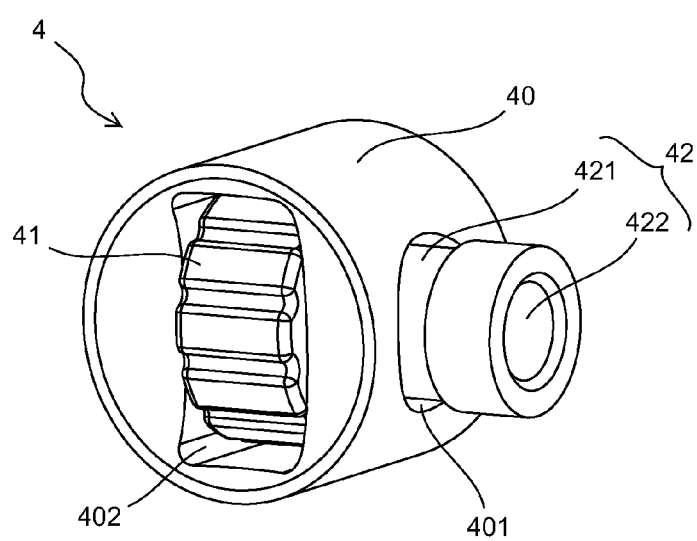
FIG. 4 is a perspective view of a screw adjusting element in a braking handlebar for a bicycle according to the invention.
Figure 5:
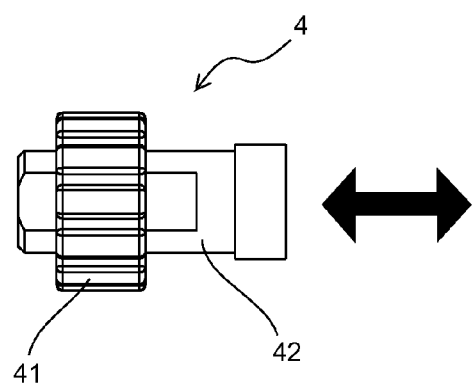
FIG. 5 is a side view of a screw adjusting element in a braking handlebar for a bicycle according to the invention.

FIG. 1 is a side view of a braking handlebar for a bicycle according to the invention. FIG. 2 is a cross-sectional view of a braking handlebar for a bicycle according to the invention. FIG. 3 and FIG. 3A are perspective views of a braking handlebar for a bicycle according to the invention. FIG. 4 is a perspective view of a screw adjusting element in a braking handlebar for a bicycle according to the invention. FIG. 5 is a side view of a screw adjusting element in a braking handlebar for a bicycle according to the invention.

Referring to FIG. 1 through FIG. 5, a braking handlebar 1 for a bicycle according to the invention includes a combining device 2, a braking handlebar 3 and a screw adjusting element 4.

One end of the combining device 2 is axially mounted to a handle 10 of a bicycle (not shown). The diameter where the combining device 2 is connected to the handle 10 is slightly smaller than the diameter of the handle 10. The combining device 2 can consist of a M6 screw 21, a first extending sleeve 22 and a second extending sleeve 23. The M6 screw 21 is connected to the braking handlebar 3. The first extending sleeve 22 is connected to the M6 screw 21. The second extending sleeve 23 surrounds the first extending sleeve 22 and the M6 screw 21.

The braking handlebar 3 has a pressing section 31, a pivoting section 32 and an accommodating section 33. The pivoting section 32 is pivotally connected to one end of the combining device 2 opposite to the handle 10. The accommodating section 33 is in parallel to an axial direction of the handle 10.

The screw adjusting element 4 is movable mounted to the accommodating section 33 of the braking handlebar 3, and connected to one end of a braking cable 11. The braking cable 11 is loosened or tightened by using the screw adjusting element 4. More specifically, the adjustable screw 41 drives an inner screw tube 42 to shift. When the inner screw tube 42 moves toward the handle 10, the braking cable 11 is loosened for replacement of the braking cable 11. When the inner screw tube 42 moves away from the handle 10, the braking cable 11 is tightened. By this way, the loosing and tightening operation of the braking cable 11 can be achieved.

Furthermore, the screw adjusting element 4 includes a cylindrical body 40, an adjustable screw 41 and the inner screw tube 42. The cylindrical body 40 can be movable mounted inside accommodating section 33, and has a horizontal penetrating hole 401 and a vertical penetrating hole 402. The horizontal penetrating hole 401 is in parallel to the axial direction of the handle 10. The axial direction of the horizontal penetrating hole 401 is vertical to the axial direction of the vertical penetrating hole 402. The inner screw tube 42 is in parallel to the axial direction of the handle 10 and penetrates through the horizontal penetrating hole 401, and has a thread part 421 and a head 422. The adjustable crew 41 is movable screwed onto the thread part 421 of the inner screw tube 42, and penetrates through the vertical penetrating hole 402 in manner of being able to rotate. The head 422 is connected to one end of thread part 421 away from the handle 10. The braking cable 11 penetrates through the thread part 421 and is secured onto the head 422.

The inner screw tube 42 penetrates through the horizontal penetrating hole 401, remaining a space for moving. The adjustable screw 41 penetrates through the vertical penetrating hole 402, remaining a space for moving as well.

Figure 6:
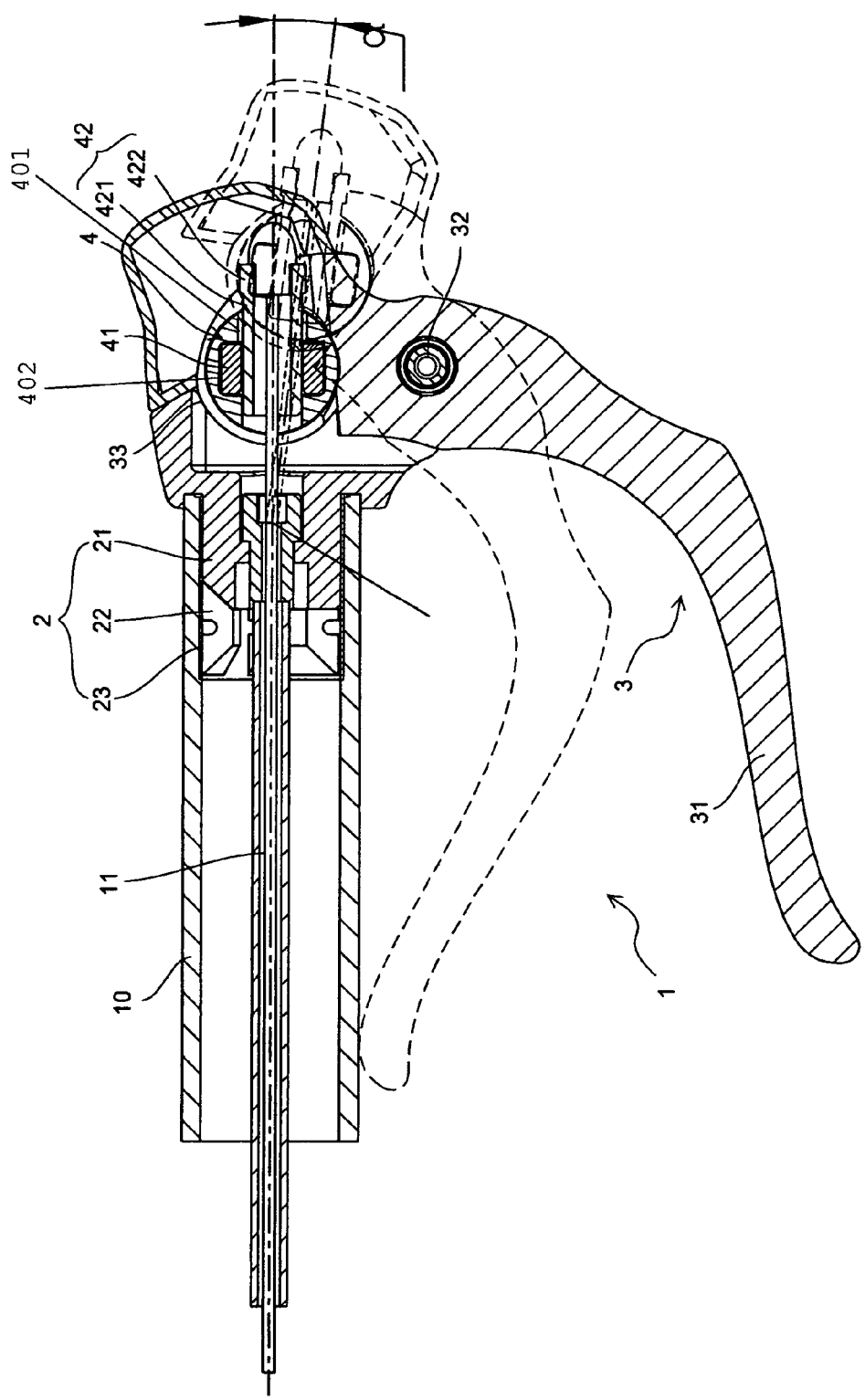
FIG. 6 is a cross-sectional view of a braking handlebar for bicycle at braking status according to the invention.

FIG. 6 is a cross-sectional view of a braking handlebar under a braking status according to the invention.

Referring to FIG. 6, when the pressing section 31 is not pressed down and is at its normal status, the core of the inner screw tube 42 is as high as the core of the handle 10 as shown in FIG. 2. When the pressing section 31 is pressed down and becomes to be a braking status, due to the space for moving between the inner screw tube 42 and the horizontal penetrating hole 401, and the space for moving between the adjustable screw 41 and the vertical penetrating hole 402, the screw adjusting element 4 stands at tilt angle α in order to cooperation with the braking cable 11. This configuration allows the inner screw tube 42 to be in balance and prevents overdue bent angle and friction of the braking cable 11. The core of the inner screw tube 42 is slightly lower than the core of the handle 10 as shown in FIG. 6.

By means of the above configuration in which the diameter where the combining device 2 is connected to the handle 10 is slightly smaller than the diameter of the handle 10, and the core of the inner screw tube 42 is as high as the core of the handle 10 at normal status, the rotatable screw adjusting element 4, the space between the inner screw tube 42 and the horizontal penetrating hole 401 and the space between the adjustable screw 41 and the vertical penetrating hole 402 allow the core of the inner screw tube 42 is slightly lower than the core of the handle 10. Thereby the braking cable 11 at the connection between the combining device 2 and the handle 10 is prevented to be excessively large, avoiding any deterioration to braking effect. Moreover, the excessive friction at the connection of combining device 2 with the handle 10 due to over bent braking cable can be prevented, which avoids malfunction of braking system.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A braking handlebar for a bicycle, comprising:
   a combining device, one end thereof being axially mounted to a handle;
   a braking handlebar, having a pressing section, a pivoting section and an accommodating section, wherein the pivoting section is pivotally connected to one end of the combining device opposite to the handle, and the accommodating section is in parallel to an axial direction of the handle; and
   a screw adjusting element, wherein the screw adjusting element comprises a cylindrical body, an adjustable screw and an inner screw tube, wherein the cylindrical body is rotatable defined inside accommodating section and has a horizontal penetrating hole and a vertical penetrating hole: the horizontal penetrating hole is in parallel to the axial direction of the handle; the axial direction of the horizontal penetrating hole is vertical to the axial direction of the vertical penetrating hole: the inner screw tube is in parallel to the axial direction of the handle and penetrates through the horizontal penetrating hole, and has a thread part and a head; the adjustable screw is movably screwed onto the thread part of the inner screw tube, and penetrates through the vertical penetrating hole in manner of being able to rotate; the head is connected to one end of thread part away from the handle; a braking cable penetrates through the thread part and is secured onto the head: the inner screw tube penetrates through the horizontal penetrating hole, remaining a space for moving: and the adjustable screw penetrates through the vertical penetrating hole, remaining a space for moving as well, movable to the accommodating section of the braking handlebar and connected to one end of the braking cable;
   wherein the braking cable is loosened or tightened by using the screw adjusting element.

2. The braking handlebar of claim 1, wherein when the pressing section is not pressed down and is at its normal status, a core of the inner screw tube is as high as a core of the handle.

3. The braking handlebar of claim 1, wherein when the pressing section is pressed down and becomes to be a braking status, a core of the inner screw tube is slightly lower than a core of the handle, and the screw adjusting element stands at tilt angle in order to cooperation with the braking cable.

4. The braking handlebar of claim 1, wherein the combining device consists of a M6 screw, a first extending sleeve and a second extending sleeve; the M6 screw is connected to the braking handlebar; the first extending sleeve is connected to the M6 screw; and the second extending sleeve surrounds the first extending sleeve and the M6 screw.

\* \* \* \* \*